June 7, 1932.     H. E. WARREN     1,862,356
ELECTRIC MOTOR
Filed July 14, 1930      2 Sheets-Sheet 1

Inventor:
Henry E. Warren,
by Charles A. Tullar
His Attorney.

June 7, 1932.  H. E. WARREN  1,862,356
ELECTRIC MOTOR
Filed July 14, 1930   2 Sheets-Sheet 2

Inventor:
Henry E. Warren,
by Charles E. Tullar
His Attorney.

Patented June 7, 1932

1,862,356

UNITED STATES PATENT OFFICE

HENRY E. WARREN, OF ASHLAND, MASSACHUSETTS, ASSIGNOR TO WARREN TELE-
CHRON COMPANY, OF ASHLAND, MASSACHUSETTS, A CORPORATION OF MAINE

ELECTRIC MOTOR

Application filed July 14, 1930. Serial No. 467,743.

My invention relates to electric motors and is particularly adapted for use in small motors such as those for driving timing devices. One object of the invention is to provide a self-starting synchronous motor operating at a very low speed so as to substantially eliminate the reduction gearing and lubricating problems usually present in small timing motors. Another object of the invention is to provide a small size, low cost motor of simple construction which is quiet in operation and economical in the consumption of electric energy. Other objects and advantages of the invention will appear as the invention is explained.

In carrying my invention into effect I provide an alternating current field member, preferably of the single phase, bipolar, shaded pole type for producing a rotating magnetic field in the air gap thereof, together with means for producing a unidirectional field generally at right angles to the rotating magnetic field through the air gap. I preferably employ a permanent magnet for the unidirectional field. This permanent magnet field serves to polarize a magnetic armature which is so mounted in the air gap as to permit it to gyrate in synchronism with the rotating magnetic field. The motion of the gyrating armature is confined by causing it to roll on a suitable retaining surface. The contacting surfaces of the gyrating and retaining members are arranged in telescoping relation and are of different peripheral lengths and are of such character as to prevent any appreciable slipping motion between the two in a tangential direction. As a result, a slow relative rotation between the gyrating and retaining members takes place, depending upon the ratio of the peripheral lengths of the contacting surfaces. One of the surfaces, preferably the retaining surface, is prevented from rotating, whereby the other member becomes the rotor element of the motor. Suitable means are provided for transmitting such rotary motion to external devices.

In a copending application, Serial No. 467,742 filed concurrently herewith and assigned to the same assignee as the present invention, I have described several modifications of such a motor and have presented broad claims covering the modifications described herein. The claims in application Serial No. 467,742 cover broadly all forms of motors in which there is a bipolar rotating magnetic field influencing a polarized armature which is dimensioned and mounted to gyrate in synchronism with the rotary magnetic field, together with means for converting the gyratory movement into a useful rotary movement which may be synchronous or asynchronous with the rotating magnetic field at a materially reduced speed. The essential difference between the motors described in said other application and those described herein is in the character of the contacting surfaces between the gyrating and retaining members and in the means for transmitting rotary motion from the motor.

The features of the modification herein described which are believed to be new and patentable will be pointed out in the claims appended hereto. For a better understanding of the invention reference is made in the following description to the accompanying drawings, in which Fig. 1 shows a partial sectional view of a motor at right angles to the rotor axis in which the magnetic gyrating rotor armature element is provided with a fluted or corrugated surface cooperating with a correspondingly shaped surface on a stationary retaining member. These surfaces serve the same purpose as gear teeth to cause a constant average driving ratio between the gyrating and retaining members, as the former gyrates about the latter in synchronism with the rotating magnetic field in which the armature is located.

Figure 2:
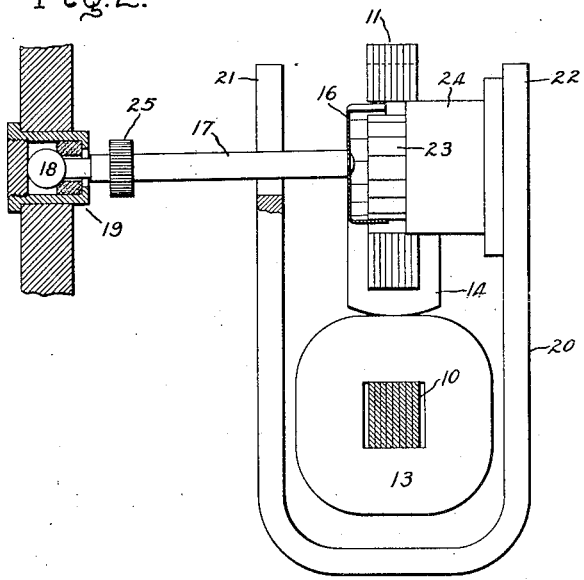
Fig. 2 is a partial sectional view taken at right angles to Fig. 1 and shows the universal bearing for the shaft of the gyrating rotor element with a drive gear pinion located close to the bearing where the gyrating movement is small.
Figure 1:
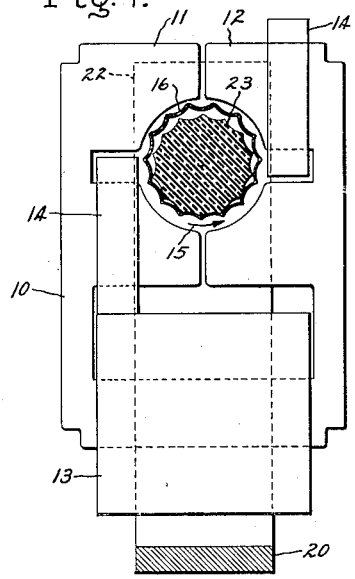
Figure 8:
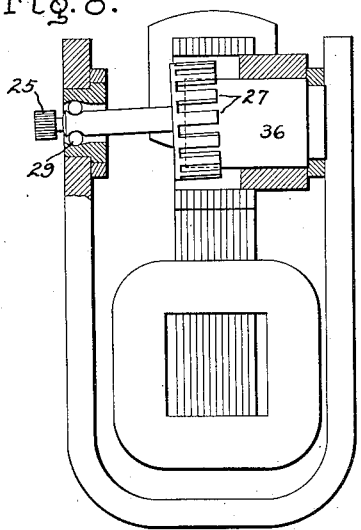
Figure 7:
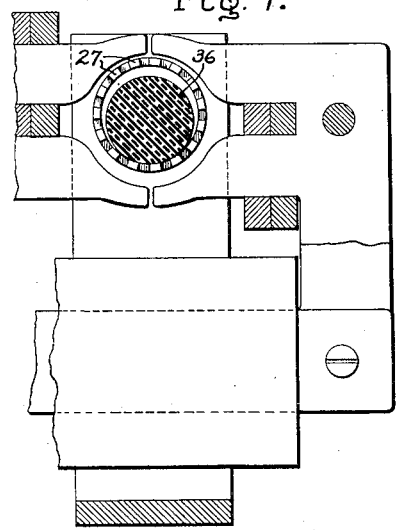

Figs. 7 and 8 are views corresponding to those of Figs. 1 and 2, respectively, of a motor with a toothed magnetic gyrating rotor and a smooth circular retaining member. In this modification, as well as in the modification of Fig. 5, the rotor teeth are spaced so as to have a magnetic gear action with the stationary pole tips on opposite sides of the rotor as the armature gyrates, to assist in maintaining a subsynchronous relation between the rotating magnetic field and the slower rotational movement of the gyrating armature.

It will be noted that in all of the modifications described I have provided a drive gear pinion directly on the rotor shaft at a point close to the universal bearing about which the rotor gyrates where the extent of gyration is small.

Referring now to Figs. 1 and 2, it will be noted that the motor comprises a single phase, bipolar shaded pole field member provided with a substantially circular shaped air gap in which there is located an armature member arranged so as to gyrate as well as rotate, which armature is constantly polarized at a given magnetic polarity by a permanent magnet field. The arrangement is such that the rotor armature gyrates about an inner retaining member in synchronism with the rotating magnetic field produced by the shaded pole field element, and, in its gyration, rolls about the smaller retaining member to cause a relatively slow subsynchronous rotation of the gyrating element. This action will be clearer after a detailed description of the parts and their functions.

The bipolar field element 10, with its pole pieces 11 and 12, is energized by a single phase coil 13. The alternating flux thus produced through the circular armature air gap is caused to be shifted or given a rotational movement by reason of the shading coils 14 on the split portions of the pole pieces 11 and 12. Other means than that described may be provided for producing a bipolar rotating magnetic field in the armature air gap. With the position of the shading coils shown in Fig. 1, the direction of rotation of the field will be in a counter-clockwise direction, as indicated by the arrow 15. This arrow may thus represent a north pole field and then there will be a south pole field on the opposite side of the armature travelling in the same direction of rotation. If we assume the frequency of the source of supply to be 60 cycles, this bipolar field will rotate at 3600 R. P. M.

In the circular air gap is a thin cup-shaped magnetic armature member 16 secured to the end of a magnetic shaft 17 which is provided with a universal ball bearing 18 in a stationary support 19 adjacent its other end. The armature 16 is polarized at a constant magnetic polarity in any suitable manner. I prefer to employ a permanent magnet 20 for this purpose. The armature 16 is located between the pole pieces of the permanent magnet, the shaft 17 passing through a central opening in the pole piece 21 of the permanent magnet. The permanent magnet flux from pole piece 21 will thus follow the shaft 17, armature 16, the surrounding pole pieces 11 and 12, and cross the air gap to the other pole piece 22. This will polarize the armature 16, giving it the same polarity as the pole piece 21 which we will assume is a north pole. The retaining member 23 and its support 24 extending from pole 22 are of non-magnetic material. The retaining member 23, or at least its surface, is preferably made of a noise deadening material such as rubber and the support 24 may be of brass.

Since the armature 16 is completely polarized as a north pole, it will be repelled by the rotating north pole field 15 and attracted by the south pole field of the rotating magnetic field produced by the electromagnet in the air gap. By reason of this arrangement it will be apparent that the armature 16 will gyrate, if it is allowed to do so, in synchronism with and in the same direction as the rotating magnetic field. It will be noted that the outer diameter of the retaining member 23 is somewhat smaller than the inner diameter of the armature 16 and the circular air gap between the pole pieces 11 and 12 is sufficiently larger than the armature to allow of a limited free bodily movement of the armature in the plane of the rotating magnetic field, the armature contacting with the retaining member and just clearing the surrounding pole piece surfaces. Since the bearing at 18 is a universal bearing the armature 16 is thus permitted to gyrate in synchronism with the rotating magnetic field, the extent of such gyrational movement being limited by the retaining member 23.

If no slipping action occurs between the armature and retaining member as the former rolls upon the latter the armature will rotate as well as gyrate, the extent of such rotation being determined by the difference in the lengths of the peripheral contacting surfaces which are in telescoping relation. To assist in establishing this driving relation between the armature and stationary retaining member, the armature is provided with equally spaced shallow corrugations or flutes and the retaining post has corresponding flutes or corrugations in its outer surface. In the illustration the number of corrugations in the armature is 15 and the number in the retaining post is one less. These corrugated parts thus serve the same purpose as gear teeth to assist in the rotation of the armature as it gyrates. The armature will rotate 1/15th of a revolution for each gyration in the same direction as that of gyration and in a 60 cycle motor the shaft 17 will thus rotate 1/15th of 3600, or 240 R. P. M. The magnetic forces and the centrifugal force of gyration will positively maintain the driving relation so that such devices as clocks, time switches, and the like, may be driven by this motor without employing extensive speed reducing gear trains, and without encountering lubricating difficulties incident to high rotational speeds. If the retaining member is made of a noise deadening material, such as crepe rubber, the motor is extremely quiet in operation. The moment of inertia of the armature is very small and the permanent magnet field tends to magnetically lock the rotor as soon as the alternating current field ceases and as a result the motor starts and stops substantially instantaneously with the energization and deenergization of the alternating current field. Owing to the presence of the permanent magnet field, I have found that the alternating current input to this motor is very materially less than in previous motors employed for the same service.

It will be noted that the shaft 17 is provided with a drive or terminal spur gear 25 which is located close to the universal bearing 18 and removed from the armature. I find that by placing the terminal drive gear at this point where the gyrating movement of the shaft is negligible, no special arrangements are necessary for taking off the rotational movement to drive external devices and that ordinary gearing with a little clearance may be employed.

The remaining figures show motors employing the same general principles of operation as has already been described and except for the parts which are different it will be unnecessary to repeat the description. The parts which are essentially the same in all the figures are referred to where necessary by like reference characters.

Figure 4:
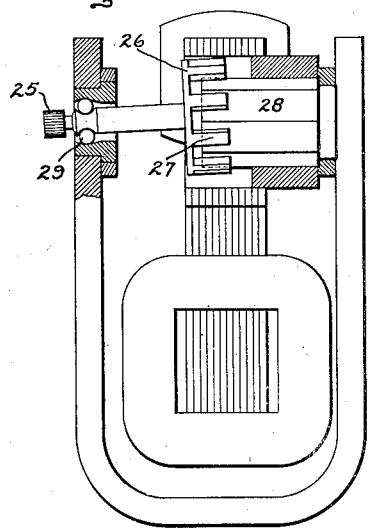
Figs. 3 and 4 are views corresponding to those of Figs. 1 and 2, respectively, of a motor in which the rotor gyrating element is provided with large teeth cooperating with a polygon shaped retaining member answering the same purpose as the fluted surfaces in Fig. 1.
Figure 3:
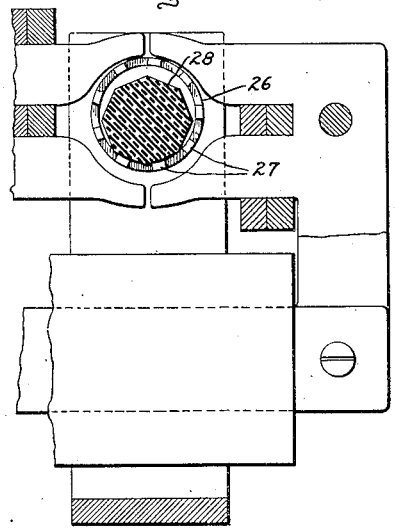

In Figs. 3 and 4 the armature comprises a magnetic cup-shaped member 26 provided with large slots in its cylindrical surface leaving equally spaced teeth 27 parallel to the axis within the rotating magnetic field air gap. The retaining member is a rubber post 28 having a polygon outer surface, the number of sides in which is one less than the number of armature teeth. As shown, there are nine teeth in the armature and eight sides in the polygon surface. The clearance of the armature member between pole faces and retaining member is greater than in Fig. 1 to allow for the greater extent of gyration and lesser speed reduction ratio between the rotating magnetic field and the rotor. In this case the armature advances 1/9th of a revolution for each gyration and the speed of rotation is therefore $$\frac{3600}{9} = 400 \text{ R. P. M.}$$

The direction of rotation of the magnetic field and armature is clockwise for the position of the shading coils as viewed in Fig. 3. The diameter of the polygon is so chosen that when the teeth 27 of the rotor engage in the center of the faces of the polygon, the speed of the rotor is slightly above its subsynchronous value and when the teeth engage near the angles of the polygon the speed is slightly less than the subsynchronous value due to the different diameter of the retaining member at these points. Under these conditions the engagement will take place at some intermediate point of the polygon sides where the effective diameter and speed exactly corresponds to the subsynchronous speed of 400 R. P. M. and if for any reason the rotor tends to run fast, then it will automatically slow up by over-reaching on the polygon face at points where the effective diameter is larger and if it tends to run slow the teeth will come back to points of engagement nearer the center of the polygon faces, resulting in a faster speed. Such a motor may hunt slightly above and below subsynchronous speed but will have a speed ratio corrective action and will maintain a true average subsynchronous speed corresponding to the effective diameters of the surfaces at the average point of contact and thus maintain a constant average driving ratio between the rotating magnetic field and the rotor. This speed ratio corrective action will also occur with the arrangement of Fig. 1, if it tends to hunt. The retaining post is preferably of rubber or has a nonmagnetic post with a rubber outer surface.

A different form of universal ball bearing is represented at 29 and the gear 25 is mounted on the opposite side of the bearing from the armature but close to the bearing so as to have negligible movement of gyration.

Figure 6:
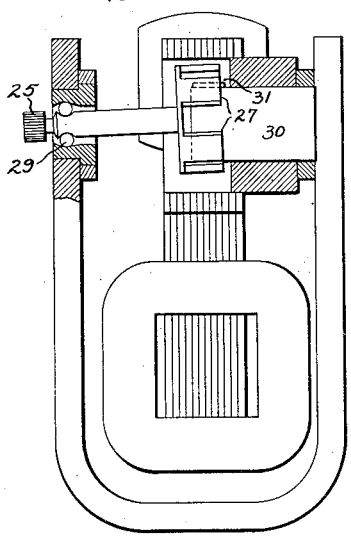
Figs. 5 and 6 are views corresponding to those of Figs. 1 and 2, respectively, of a motor with a toothed gyrating element cooperating with a stationary retaining member having a single large tooth, the purpose of which arrangement is to cause the extent of rotation of the armature to be constant for each gyration.
Figure 5:
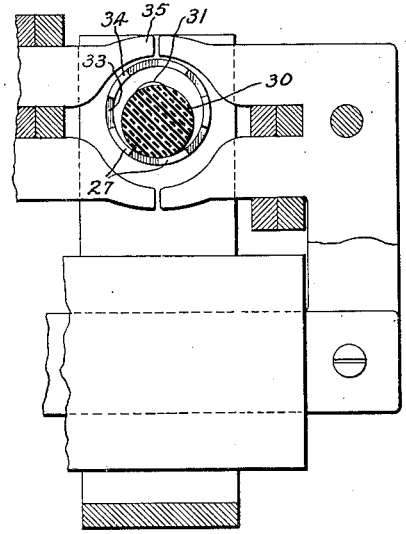

Figs. 5 and 6 show a motor quite similar to that of Figs. 3 and 4, the essential difference in construction being in the retaining post 30. Here the post is circular except for a single projection 31 which acts somewhat as a single tooth on a gear locking into the space between the armature teeth 27 once for each gyration, the armature advancing one tooth distance for each gyration. It will be noted that the projection tooth 31 is so positioned with respect to the closely adjacent pole tips of the electromagnet that the tendency of a tooth 26 to be attracted to a pole tip as it approaches nearest thereto aids in maintaining the subsynchronous rotation. For example, with clockwise rotation of the armature the tooth 31 will next enter the slot 33 in approximately one-half gyration. Tooth 34 is near the pole tip 35 where the flux is concentrated. Any tendency for the tooth to get materially ahead or behind the position shown will be magnetically resisted by the attraction between the pole tip 35 and the polar tooth 34. For this relation to exist on opposite diameters of the rotor, the teeth or poles in the rotor should be an uneven number. Five teeth are shown and the speed of rotation on 60 cycles is 1/5th of 3600, or 720 R. P. M.

In the modification shown in Figs. 7 and 8 the retaining post 36 has a smooth circular surface. The rotor armature has 15 teeth 27 and if the difference between the inner diameter of the rotor and the outer diameter of the retaining post is properly chosen so that without slipping the rotation of the armature is approximately 1/15th of a revolution per gyration, or 240 R. P. M. The passage of the teeth or poles in the rotor successively past the air gaps between the stationary pole tips where the flux is concentrated will magnetically maintain this subsynchronous speed since at this speed the rotor advances one tooth distance per gyration and there being an uneven number of teeth they will have what may be termed a regular recurring magnetic gear action with respect to the pole tips on opposite sides of the armature every half gyration.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

1. An electric motor having a field element provided with an air gap and means for producing a bipolar rotating magnetic field in said air gap, a polarized rotor member in said air gap, a stationary retaining member for the rotor member centrally located with respect to the axis of rotation of the rotating magnetic field about which said rotor is permitted to gyrate in synchronism with said field, a shaft upon which said rotor member is mounted, a universal bearing for said shaft at a point removed from the rotor member, and a drive gear on said shaft closely adjacent to said bearing.

2. An electric motor having a field member provided with an air gap and means for producing a bipolar rotating magnetic field in said air gap, a magnetic armature in said air gap, a permanent magnet having its poles on opposite sides of said air gap for producing a flux at approximately right angles to the rotating magnetic field for polarizing the armature, a retaining member for said armature having a peripheral surface contacting with the peripheral surface of said armature, said surfaces being of different lengths and arranged in telescoping relation, a magnetic shaft upon which the armature is mounted extending through an opening in one pole of the permanent magnet, a universal bearing for said shaft removed from the armature, and a drive gear on said shaft closely adjacent the bearing.

3. An electric motor having a field member provided with an air gap and means for producing a bipolar rotating magnetic field in said air gap, a polarized armature in said air gap arranged to gyrate therein in synchronism with the rotating magnetic field, a retaining member for limiting the gyrating movement of said armature and causing the armature to rotate at a slower rate than the rotating magnetic field as the armature gyrates, a shaft carrying the armature at one end, a universal ball bearing adjacent the other end of said shaft, and a drive gear on the shaft closely adjacent the bearing.

4. An electric motor having a field member provided with an air gap and means for producing a bipolar rotating magnetic field in said air gap, a thin cup-shaped polarized magnetic rotor armature arranged to gyrate in synchronism with the rotating magnetic field in said air gap, a stationary post telescoping into said cup-shaped armature to limit the extent of the gyrations of said armature, the contacting surfaces of said armature and post being provided with shallow corrugations serving the purpose of gear teeth, there being at least one more corrugation in the armature than in the post whereby the armature is given a rotary movement as it gyrates about said post, a shaft on which the armature is mounted at one end, a universal bearing adjacent the other end of said shaft, and means adjacent said bearing for transmitting the rotary motion of said shaft.

5. An electric motor having a field member provided with an air gap and means for producing a rotating magnetic field in said airgap, a polarized armature member in said air gap arranged to gyrate in synchronism with the rotating magnetic field, a retaining member on which said armature rolls as it gyrates to cause a relatively slow rotary movement between said members, one of which is stationary, the contacting surface of said members having evenly spaced intermeshed parts of such a character as to function as gear teeth while permitting the point of contact of the parts to vary the rotation ratio between said members, the number of intermeshed parts in the two surfaces being different and approximately proportional to the diameters of said surfaces at the average point of contact.

6. An electric motor having a field member provided with an air gap and means for producing a bipolar magnetic field in said air gap, a polarized magnetic armature member arranged to gyrate in synchronism with the rotating magnetic field in said air gap, said armature member being in the form of a cup with slots in its slides parallel with its axis forming a number of equally spaced teeth, a retaining member for said armature to limit the extent of its gyrations, said retaining member having a polygon-shaped surface with which the teeth of the armature contact in gyrating, the number of teeth in the armature and the number of polygon sides of the retaining member being different in a ratio approximately equal to the difference of the effective diameters of said members at their contacting surfaces, a drive shaft extending in an axial direction from and on one end of which is mounted the armature, and a universal bearing for the shaft at a point removed from the armature.

7. An electric motor having a bipolar, split, shaded pole, single phase field element with a circular-shaped air gap formed between the split shaded poles, the shaded and unshaded pole tips of opposite poles extending in close proximity to each other on opposite diameters of the circular air gap, a magnetic, polarizer rotor armature member arranged to gyrate in synchronism with the rotating magnetic field in said air gap, said rotor armature having an uneven number of equally spaced polar teeth arrranged in a circle and extending in an axial direction, an inner stationary retaining member for said armature having a cylindrical surface with which the teeth contact as the armature gyrates for limiting the extent of gyration, the effective diameters of the armature and retaining members at the contacting surfaces being such that the armature is rotated the distance corresponding to the spacing between the teeth therein for each gyration, and a drive shaft for said motor having a universal bearing adjacent one end with the armature mounted on the other end.

8. An electric motor having a bipolar, split, shaded pole, single phase field element with a circular shaped air gap formed between the split shaded poles, the shaded and unshaded pole tips of opposite poles extending in close proximity to each other on opposite diameters of the circular air gap, a magnetic polarized rotor armature member arranged to gyrate in synchronism with said magnetic field, a retaining surface upon which said armature rolls as it gyrates to cause a relatively slower rotary movement of the armature, the armature member being provided with an uneven number of equally spaced polar sections, the rotational movement of the armature for each gyration being such as corresponds to a regular recurring magnetic gear action between the armature polar sections and the pole tips on opposite diameters of the circular air gap as the armature approaches such points in its gyratory movement.

In witness whereof, I have hereto set my hand this 3d day of July, 1930.

HENRY E. WARREN.